United States Patent
Fukasawa

(12) Patent No.: US 6,553,090 B2
(45) Date of Patent: Apr. 22, 2003

(54) CONTROL SYSTEM OF NUCLEAR POWER PLANT, AND CONTROL METHOD THEREOF

(75) Inventor: Yukihisa Fukasawa, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/038,616

(22) Filed: Jan. 8, 2002

(65) Prior Publication Data
US 2002/0067790 A1 Jun. 6, 2002

Related U.S. Application Data

(62) Division of application No. 09/345,737, filed on Jul. 1, 1999.

(30) Foreign Application Priority Data
Jul. 2, 1998 (JP) .......................................... 10-187135

(51) Int. Cl.[7] .............................................. G21C 7/00
(52) U.S. Cl. ..................... 376/216; 376/210; 376/215; 376/217; 376/218; 376/219; 376/254; 376/259; 376/236; 376/241; 376/242
(58) Field of Search ................................. 376/210, 215, 376/216, 217, 218, 219, 254, 259, 236, 241, 242

(56) References Cited

U.S. PATENT DOCUMENTS

| | | | |
|---|---|---|---|
| 4,170,516 A | | 10/1979 | Shinbo et al. |
| 4,333,797 A | * | 6/1982 | Nishizawa |
| 4,337,118 A | | 6/1982 | Sakurai et al. |
| 4,548,784 A | | 10/1985 | Watari |
| 4,774,049 A | * | 9/1988 | Impink, Jr. et al. |
| 5,091,139 A | * | 2/1992 | Chao et al. |
| 5,174,946 A | | 12/1992 | Watford et al. |
| 5,317,606 A | * | 5/1994 | Kinoshita et al. |
| 5,392,320 A | * | 2/1995 | Chao |
| 5,528,639 A | * | 6/1996 | Eckert et al. |
| 5,912,933 A | | 6/1999 | Shaug et al. |

FOREIGN PATENT DOCUMENTS

| | | |
|---|---|---|
| JP | 51-67898 | 6/1976 |
| JP | 55-52997 | 4/1980 |
| JP | 59-155791 | 9/1984 |
| JP | 60-76689 | 5/1985 |
| JP | 63-121794 | 5/1988 |
| JP | 4-155293 | 5/1992 |
| JP | 5-134080 | 5/1993 |
| JP | 7-294679 | 11/1995 |
| JP | 8-179078 | 7/1996 |
| JP | 9-159794 | 6/1997 |
| JP | 6-3476 | 2/2000 |

* cited by examiner

Primary Examiner—Michael J. Carone
Assistant Examiner—John Richardson
(74) Attorney, Agent, or Firm—Antonelli, Terry, Stout & Kraus, LLP

(57) ABSTRACT

A method of controlling a nuclear power plant includes determining a first maximum linear heat generation rate and a first minimum critical power ratio by a core monitoring system, and determining a second maximum linear heat generation rate and a second minimum critical power ratio by utilizing the first maximum linear heat generation rate and the first minimum critical power ratio determined by the core monitoring system and plant data. The second maximum linear heat generation rate and the second minimum critical power ratio are compared with predetermined thermal limit values and a control signal outputted from an automatic power regulator system to a re-circulation flow control system and to a control rod control system is held when at least one of the second maximum linear heat generation rate and the second minimum critical power ratio exceeds the predetermined thermal limit values.

3 Claims, 6 Drawing Sheets

CONTROL SYSTEM OF NUCLEAR POWER PLANT, AND CONTROL METHOD THEREOF

CROSS REFERENCE TO RELATED APPLICATION

This is a divisional of U.S. application Ser. No. 09/345,737, filed Jul. 1, 1999, the subject matter of which is incorporated by reference herein.

BACKGROUND OF THE INVENTION

Thermal limit values of fuel loaded into the core of a boiling water nuclear power plant include two thermal limit values, that is, the thermal limit values for a maximum linear heat generation rate and a minimum critical power ratio. The linear heat generation rate represents an output per unit length of a fuel rod in a fuel assembly and the critical power ratio represents a ratio of a fuel assembly output (critical output), when boiling transition takes place, to an actual fuel assembly output. Both can be calculated with high accuracy by using the calculation result of a three-dimensional power distribution inside the core by a core monitoring system. Generally, the core monitoring system is activated by operators in a one-hour cycle or on an on-demand basis. The operators monitor whether or not the maximum linear heat generation rate and the minimum critical power ratio exceed the respective thermal limit values on the basis of the calculation result by the core monitoring system, judge whether or not the control rod operation and the core flow rate operation should be continued, and control the reactor output.

Recently, needs have been increasing for the use of an automatic power regulator system so as to save power involved in the reactor operation and for high-speed activation to improve economy. When the high-speed operation is executed by using the automatic power regulator system, an automatic thermal limit monitor for monitoring the thermal limit values in a short cycle is necessary as back-up means for the operators. An example of the conventional automatic thermal limit monitors is described in JP-A-51-67898. This reference describes a method of monitoring the thermal limit values by the steps of calculating an output distribution in a prescribed area inside a core by a one-dimensional neutron diffusion model, comparing and collating the one-dimensional neutron diffusion result with an indication value of a local power range monitor and executing a corrected one-dimensional calculation which adds a correction to the boundary condition. Whether or not the maximum linear heat generation rate and the minimum critical power ratio satisfy the respective thermal limit values is judged by such an automatic thermal limit monitor, and when they are judged as exceeding the thermal limit values, an automatic operation exclusion instruction is outputted to the automatic power regulator system. Incidentally, the term "automatic operation exclusion" means the stop of the operation of the automatic power regulator system, and the automatic power regulator system must be activated once again to re-start the automatic operation.

According to the prior art technology described above, the maximum linear heat generation rate and the minimum critical power ratio can be calculated in a shorter cycle (about 10 seconds) than the calculation cycle (generally, one hour) of the core monitoring system for executing a three-dimensional power distribution calculation. To improve reliability, however, duplexing and further reduction of the cycle (to one second or below) are necessary in the monitoring operation of the thermal limit values by the automatic power regulator system. Because the processes for this purpose are complicated and troublesome, duplexing and further reduction of the cycle have not yet been achieved by this prior art technology.

To further shorten the calculation cycle of the maximum linear heat generation rate and the minimum critical power ratio, therefore, it may be possible to employ an automatic thermal limit monitor which calculates the maximum linear heat generation rate and the minimum critical power ratio in the following way while the core monitoring system is executing its calculation. In other words, it may be possible to correct the maximum linear eat generation rate and the minimum critical power ratio as the calculation result of the core monitoring system by utilizing the values of the plant data (for example, the output of a-local power range monitor) at the time when calculation is made by the core monitoring system and the plant data at the present moment and thus to briefly calculate the maximum linear heat generation rate and the minimum critical power ratio at the present moment.

When such an automatic thermal limit monitor is employed, duplexing for improving reliability can be achieved easily because the process is simple, and the cycle can be shortened, as well. Nonetheless, this method involves the problem that calculation accuracy of the maximum linear heat generation rate and the minimum critical power ratio is low. For this reason, the calculation error increases as the time passes from the calculation by the core monitoring system. In other words, calculation accuracy gradually gets deteriorated from immediately after the calculation by the core monitoring system, the calculation error reaches the maximum immediately before the next calculation by the core monitoring system and is again improved immediately after the next calculation by the core monitoring system.

Let's assume hereby the case where the automatic thermal limit monitor is used to judge whether or not the maximum linear heat generation rate and the minimum critical power ratio satisfy the thermal limit values, and the automatic operation exclusion instruction is outputted to the automatic power regulator system when they exceed the thermal limit values. Because calculation accuracy of the brief calculation of the maximum linear heat generation rate and the minimum critical power ratio by the automatic thermal limit monitor is low as described above, the maximum linear heat generation rate and the minimum critical power ratio exceed the respective thermal limit values in many cases under such a core condition where the maximum linear heat generation rate and the minimum critical power ratio exist in the proximity of the thermal limit values. In order to briefly calculate the maximum linear heat generation rate and the minimum critical power ratio, the automatic thermal limit monitor is designed in such a fashion that the calculation result becomes rather conservative. Therefore, the possibility that the maximum linear heat generation rate and the minimum critical power ratio exceed the thermal limit values is high when the core condition is in the proximity of the thermal limit values, or when the control rod operation quantity is great during the period in which the core monitoring system executes the calculation.

The automatic power regulator system is stopped when the maximum linear heat generation rate and the minimum critical power ratio exceed the thermal limit values. However, because calculation accuracy of the maximum linear heat generation rate and the minimum critical power ratio by the automatic thermal limit monitor is low as described above, they are judged in many cases as exceeding the thermal limit values although they do not actually exceed the thermal limit values. In such cases, the automatic power regulator system must be repeatedly stopped and re-activated. Re-activation of the automatic power regulator system is very complicated and troublesome to practice because the links with other systems such as the control rod control system, the re-circulation flow control systems, etc., must be established once again. Consequently, it is difficult by the method described above to virtually use the automatic power regulator system.

SUMMARY OF THE INVENTION

It is an object of the present invention to provide a control system of a nuclear power plant, and a control method therefor, capable of easily executing automatic power regulation by an automatic power regulator system even when a maximum linear heat generation rate and a minimum critical power ratio are determined in a short cycle by a brief calculation.

To accomplish the object described above, the present invention provides a control system of a nuclear power plant which comprises a core monitoring system for determining a maximum linear heat generation rate and a minimum critical power ratio in a certain time interval; an automatic thermal limit monitor for determining a maximum linear heat generation rate and a minimum critical power ratio by utilizing the maximum linear heat generation rate and the minimum critical power ratio determined by the core monitoring system and plant data when the core monitoring system does not execute the calculation of the maximum linear heat generation rate and the minimum critical power ratio, comparing the maximum linear heat generation rate and the minimum critical power ratio so determined with thermal limit values set in advance for them, and outputting an operation hold instruction when at least one of the maximum linear heat generation rate and the minimum critical power ratio exceeds the thermal limit values; and an automatic power regulator system for outputting control signals to a re-circulation flow control system for controlling the re-circulation flow rate in a reactor and to a control rod control system for controlling the positions of control rods in the reactor, and holding the control signals when the operation hold instruction is outputted from the automatic thermal limit monitor.

The automatic power control system holds the control signals to the control rod control system and to the re-circulation flow control system when at least one of the maximum linear heat generation rate and the minimum critical power ratio determined by the automatic thermal limit monitor exceeds the thermal limit value. Therefore, when the actual maximum linear heat generation rate and the actual minimum critical-power ratio are below the thermal limit values, the automatic power regulator system need not be re-activated, and the control of the control rods and the re-circulation flow rate can be started again smoothly. Even when the maximum linear heat generation rate and the minimum critical power ratio are determined in a short cycle by the brief calculation, therefore, automatic power regulation can be easily carried out by the automatic power regulator system. The present invention is effective for the continuation of the automatic operation particularly when the core condition exists in the proximity of the thermal limit values.

When the automatic power regulator system holds the control signal when it receives the operation hold instruction from the automatic thermal limit monitor, the present invention compares the maximum linear heat generation rate and the minimum critical power ratio determined by the core monitoring system with the thermal limit values, and stops the holding operation of the control signal by the automatic power regulator system when the maximum linear heat generation rate and the minimum critical power ratio are below the thermal limit values.

Because holding of the control signal by the automatic power regulator system is stopped when the maximum linear heat generation rate and the minimum critical power ratio that are determined highly accurately by the core monitoring system are below the thermal limit values, the automatic output regulating operation can be continued when the actual maximum linear heat generation rate and the actual minimum critical power ratio are below the set values.

When the automatic power regulator system holds the control signal as it receives the operation hold instruction from the automatic thermal limit monitor, the maximum linear heat generation rate and the minimum critical power ratio that are determined by the core monitoring system are compared with the thermal limit values, and-when at least one of the maximum linear heat generation rate and the minimum critical power ratio exceeds the thermal limit values, the output of the control signal by the automatic power regulator system is stopped.

Because the output of the control signal by the automatic power regulator system is stopped when at least one of the maximum linear heat, generation rate and the minimum critical power ratio that are determined highly accurately by the core monitoring system exceeds the thermal limit values, the automatic power regulating operation can be stopped when the actual maximum linear heat generation rate and the actual minimum critical power ratio exceed the thermal limit values.

DESCRIPTION OF THE EMBODIMENT

A preferred embodiment of the present invention will be described in detail with reference to the accompanying drawings.

Figure 1:
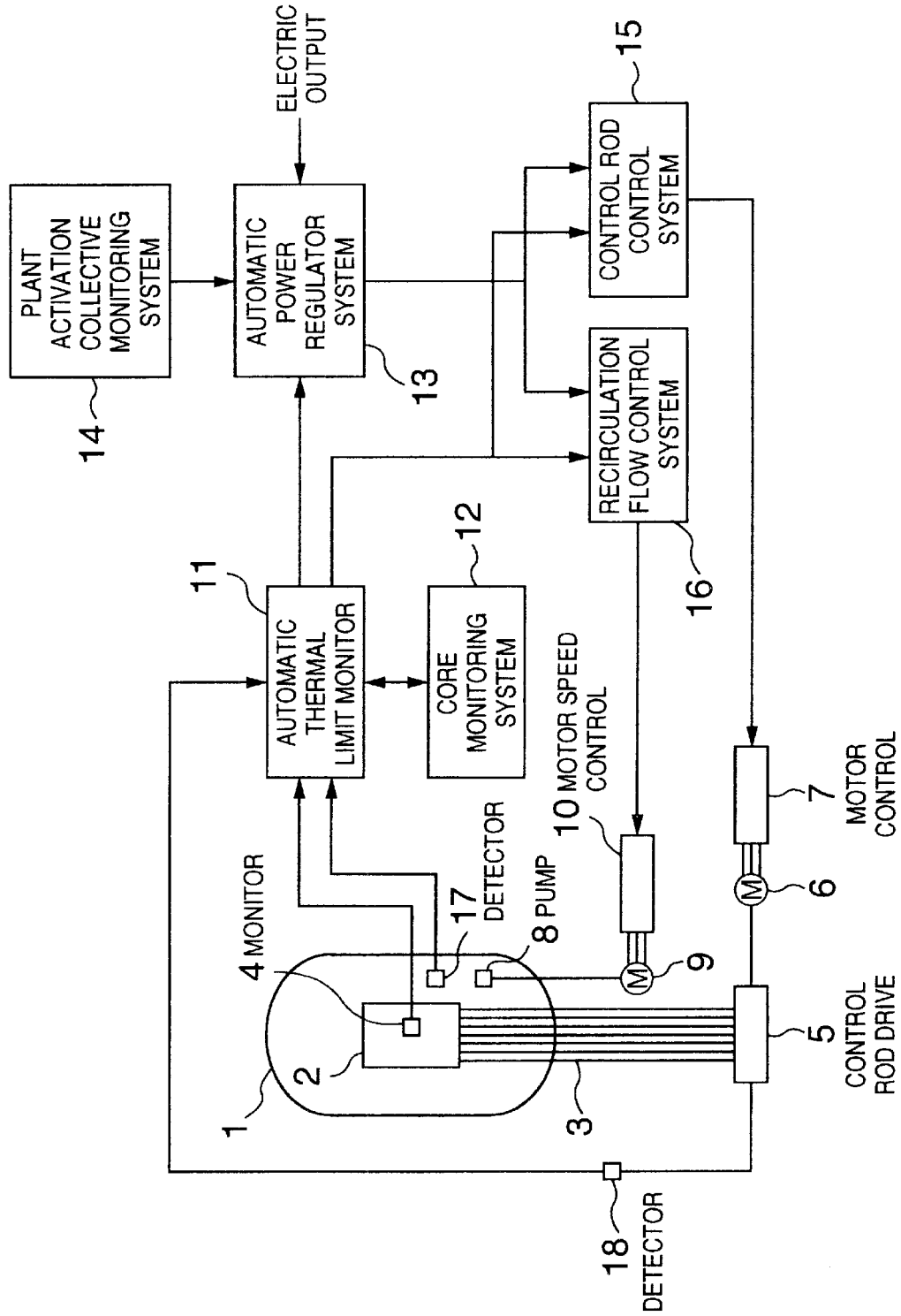
FIG. 1 is a structural view of a control system of a nuclear power plant according to a preferred embodiment of the present invention.

FIG. 1 shows a control system of a nuclear power plant according to a preferred embodiment of the present invention. A core 2 inside a reactor pressure vessel I comprises hundreds of fuel bundles. The output of a reactor is controlled by a core flow rate that depends on an insertion ratio of control rods 3 into the core and on the number of revolutions of an internal pump B. The control rods 3 are driven by a control rod drive 5, a motor 6 for activating the control rod drive 5 and a motor control circuit 7 for controlling the motor 6. The number of revolution of the internal pump 8 is controlled by a motor 9 and a motor speed control circuit 10. A local power range monitor 4 (hereinafter called the "LPRM" 4) for detecting the neutron bundles inside the reactor and a flow rate detector 17 for detecting the core flow rate are disposed inside the core 2 and their detection results are outputted to an automatic thermal limit monitor 11, respectively. The-control rod drive 5 is provided with a control rod position detector 18, and the detection result of this detector 18 is outputted to the automatic thermal limit monitor 11.

Figure 2:
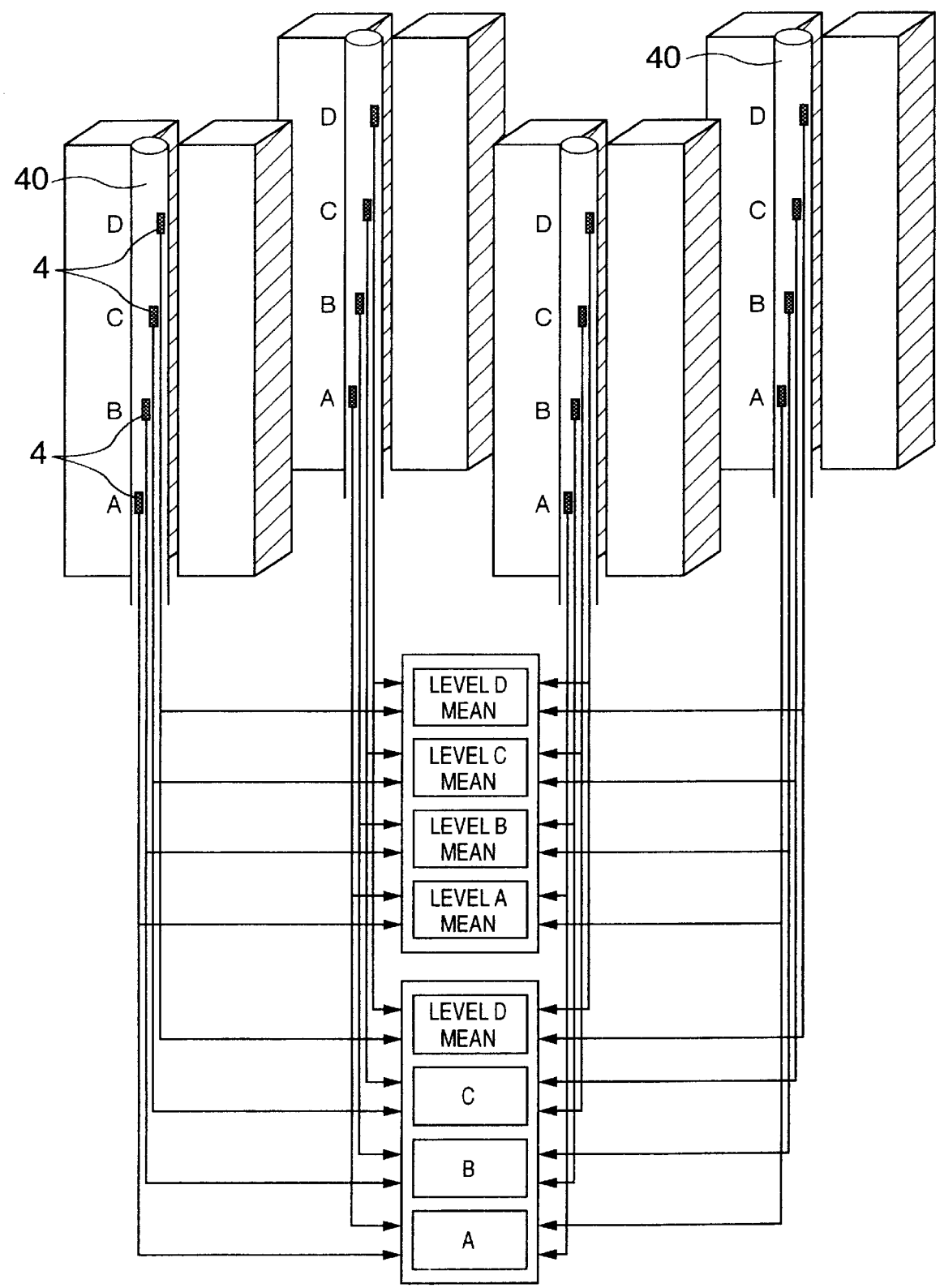
FIG. 2 is a schematic view showing an LPRM that is utilized for calculating an LPRM mean value when a maximum linear heat generation rate is calculated by an automatic thermal limit monitor.

The LPRMs 4 are disposed inside LPRM strings 40 as shown in FIG. 2. Generally, four LPRMs 4 are disposed inside one LPRM string 40. The portions of each LPRM 4 are called "A, "B", "C" and "DO" levels from the bottom in an axial direction. The LPRM strings 40 are uniformly disposed inside the core and four LPRM strings 40 encompass sixteen fuel bundles.

Referring to FIG. 1, the core monitoring system 12 calculates every ten minutes the maximum linear heat generation rate and the minimum critical power ratio and outputs them to the automatic thermal limit monitor 11. Though the maximum linear heat generation rate and the minimum critical power ratio are calculated every ten minutes in this embodiment, the calculation cycle is not particularly limited and may be an hour, for example. Needless to say, however, the shorter the calculation cycle, the higher becomes reliability of the thermal limit monitor value.

Figure 3:
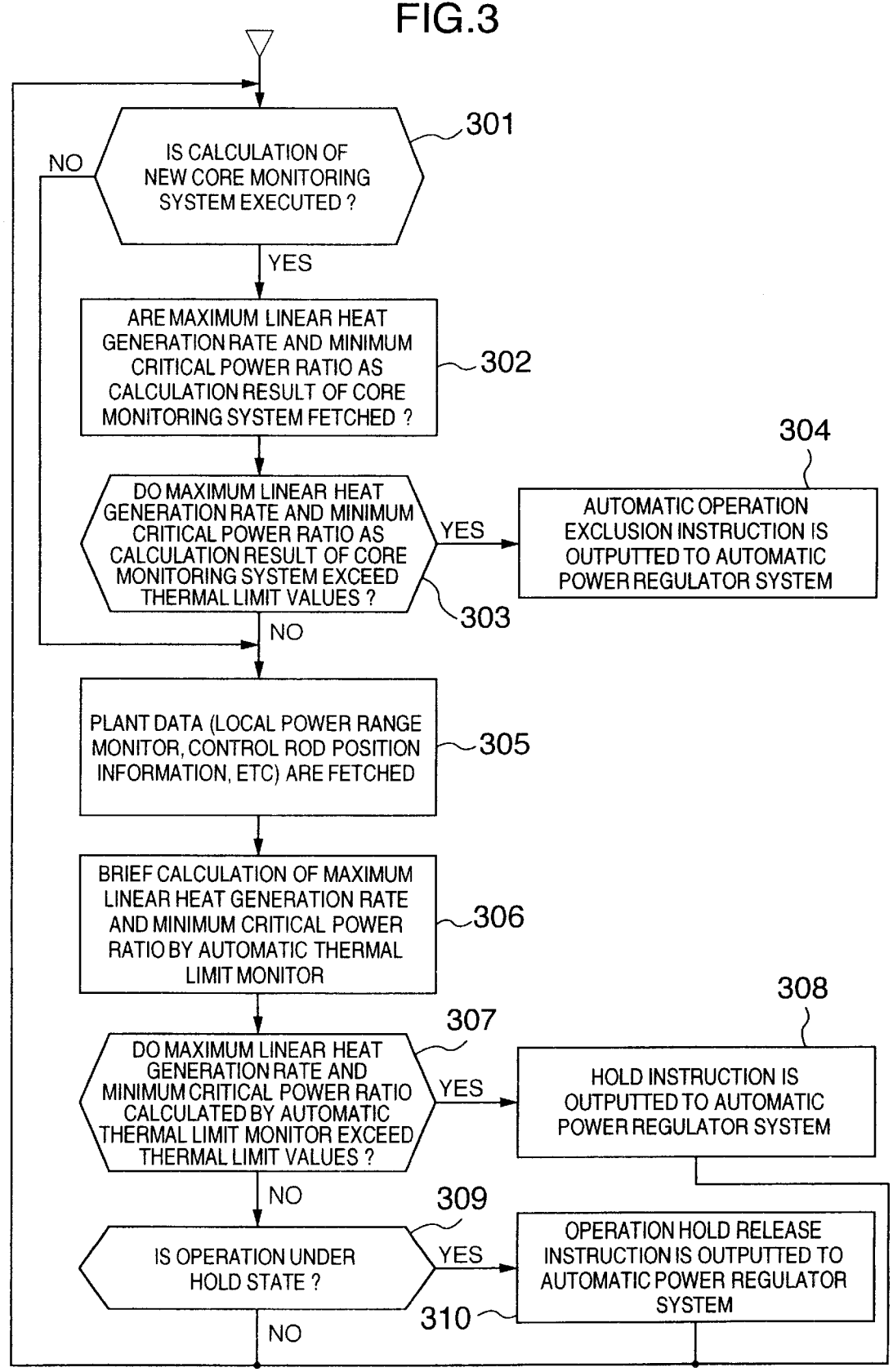
FIG. 3 is a flowchart showing a process in the automatic thermal limit monitor.

The automatic thermal limit monitor 11 will be explained hereby in detail. FIG. 3 is a flowchart showing the processing content in this automatic thermal limit monitor 11. At the first step 301, the automatic thermal limit monitor 11 judges whether or not both maximum linear heat generation rate and minimum critical power ratio are calculated afresh by the core monitoring system 12. The flow then proceeds to the step 302 when the monitor 11 judges that the calculation is done afresh, and to the step 305 when it judges that the calculation is not done afresh. The maximum linear heat generation rate and the minimum critical power ratio as the calculation results of the core monitoring system 12 are fetched from the core monitoring system 12 at the step 302. At the next step 303, the maximum linear heat generation rate and the minimum critical power ratio are compared respectively with the thermal limit values that are set in advance for them, and whether or not the maximum linear heat generation rate and the minimum critical power ratio exceed the thermal limit values is judged. The flow proceeds to the step 304 when at least one of the maximum linear heat generation rate and the minimum critical power ratio exceeds the corresponding thermal limit value, and to the step 305 if neither of them is judged as exceeding the respective thermal limit value. An automatic operation exclusion instruction is outputted to the automatic power regulator system 13 at the step 304. The detection result of the LPRM 4 and plant data such as the control rod position information are fetched at the step 305. At the next step 306 is made a brief calculation of another maximum linear heat generation rate and another minimum critical power ratio on the basis of the plant data, the maximum linear heat generation rate and the minimum critical power ratio that are so fetched. The another maximum linear heat generation rate and the another minimum critical power ratio, that are determined by the brief calculation at the step 306, are then compared with the thermal limit values that are set beforehand for them, respectively, and whether or not these another maximum linear heat generation rate and minimum critical power ratio exceed the respective thermal limit values is judged at the next step 307. The flow proceeds to the step 308 if at least one of the another maximum linear heat generation rate and the minimum critical power ratio is judged as exceeding the thermal limit value, and to the step 309 if neither of them is judged as exceeding the thermal limit values. At the step 308, an operation hold instruction is outputted to the automatic power regulator system 13. Incidentally, the automatic power regulator system 13 enters the operation hold mode when the operation hold instruction is inputted thereto. Whether or not the automatic power regulator system 13 is in the operation hold mode is judged at the step 309. The flow proceeds to the step 310 if the automatic power regulator system 13 is judged as being in the operation hold mode. After the operation hold release instruction is outputted to the automatic power regulator system 13 at the step 310, the flow then returns to the step 301. If the automatic power regulator system 13 is not judged as being in the operation hold mode, the flow returns as such to the step 301.

Next, the calculation method of the maximum linear heat generation rate and the minimum critical power ratio at the step 306 will be explained in detail. To calculate the another maximum linear heat generation rate, the area comprising the sixteen fuel bundles (with the index being defined as "M") is divided into four segments (with the index being defined as "K") in the A, B, C and D levels of the LPRM 4 in the axial direction, and the another maximum linear heat generation rate ALHGR (K, M) inside each divided area is calculated. The another maximum linear heat generation rate of the core is the greatest value among the another maximum linear heat generation rates ALHGR (K, M) determined for each area. The another maximum linear heat generation rate ALHGR (K, M) in the area (K, M) is obtained by correcting the maximum linear heat generation rate CLHGR (K, M) inside the area (K, M) calculated by the core monitoring system, on the basis of the mean value ALPRM (K, M) of the present LPRM of the area (K, M) and on the basis of the CLPRM (K, M) of the mean value of the LPRM, when the core monitoring system calculates the area (K, M), and also by executing the correction B (K, M) in accordance with the change of the control rod position from the start of the calculation by the core monitoring system. The calculation formula of the another maximum linear heat generation rate by the automatic thermal limit monitor 11 is given by the following expression (1):

$$ALHGR(K, M) = CLHGR(K, M) \cdot ALPRM(K, M)/CLPRM(K, M)/B(K, M) \quad (1)$$

Here, the LPRM mean values ALPRM (K, M) and CLPRM (K, M) are the mean of the four LPRM indication values of each level of the height A, B, C and D in the LPRM axial direction as shown in FIG. 2.

When the another minimum critical power ratio is calculated, the minimum critical power ratio inside each area comprising the sixteen fuel bundles is calculated, and the another minimum critical power ratio of the core is the smallest value among the another minimum critical power ratios ACPR(M) calculated for each area. The another minimum critical power ratio inside the area M is calculated by correcting the minimum critical output ratio CCPR(M) of the area M, that is calculated by the core monitoring system, by the mean value ALPRM(M) of the present LPRM of the area M and the LPRM mean value CLPRM(M) at the time of calculation of the area M by the core monitoring system, and by executing also the correction AC(M) in accordance with the change of the control rod position from the start of the calculation of the core monitoring system as well as the change in the core flow rate. The calculation formula of the another minimum critical power ratio by the automatic thermal limit monitor is represented by the following expression (2):

$$ACPR(M) = CCPR(M) \cdot CLPRM(M)/ALPRM(M) \cdot AC(M) \cdot AF(M) \quad (2)$$

Figure 4:
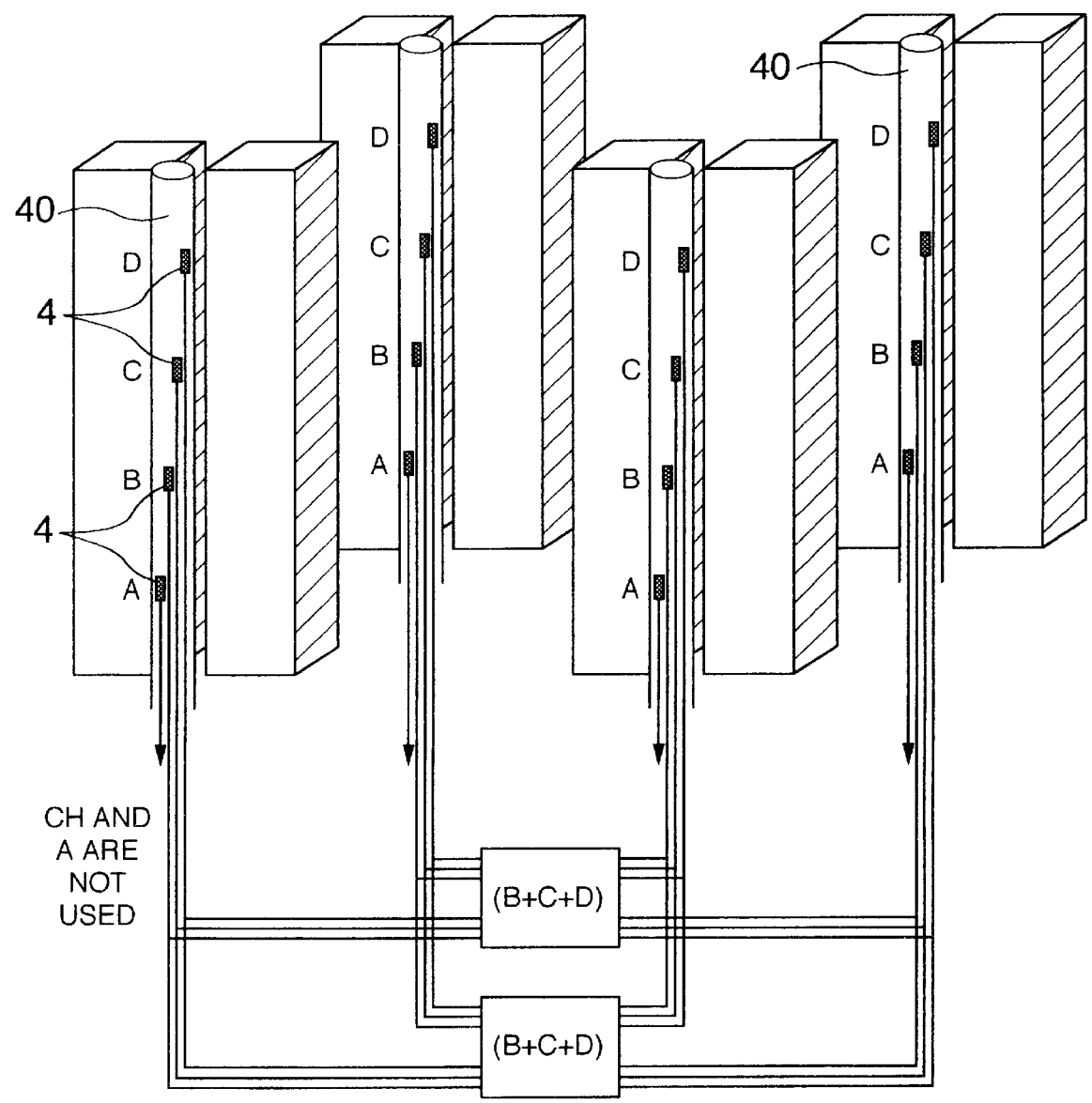
FIG. 4 is a schematic view showing the LPRM that is utilized for calculating the LPRM mean value when a minimum critical power ratio is calculated by the automatic thermal limit monitor.

Here, the LPRM mean values ALPRM(M) and CLPRM(M) are the mean values of twelve LPRMs other than the LPRM of the A level as shown in FIG. 4.

Figure 5:
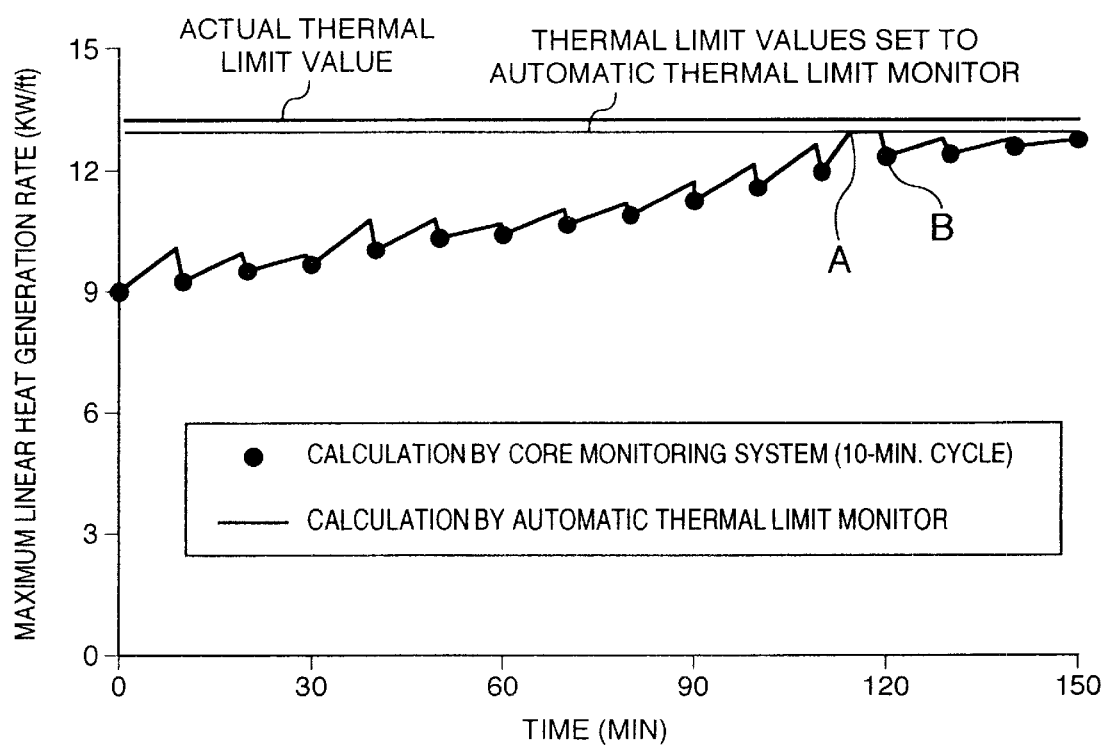
FIG. 5 is a graph showing an example of the change, with time, of the maximum linear heat generation rate calculated by a core monitoring system and the maximum linear heat generation rate calculated by the automatic thermal limit monitor.

FIG. 5 shows an example of the changes, with time, of the maximum linear heat generation rate calculated by the core monitoring system 12 and the another maximum linear heat generation rate calculated by the automatic thermal limit monitor 11. Though the maximum linear heat generation rate will be explained hereinafter, the explanation holds true of the minimum critical power ratio. In FIG. 5, the core monitoring system 12 calculates the maximum linear heat generation rate in the 10-minute cycle, and the automatic thermal limit monitor 11 executes the brief calculation of the another maximum linear heat generation rate between the calculations by the core monitoring system 12. As can be understood from FIG. 5, calculation accuracy of the another maximum linear heat generation rate, that is briefly calculated by the automatic thermal limit monitor 11, gets gradually deteriorated immediately after the calculation by the core monitoring system 12. The calculation error reaches the maximum immediately before the next calculation by the core monitoring system 12 and calculation accuracy is again improved immediately after this calculation.

As shown in FIG. 5, the automatic thermal limit monitor 11 is designed in such a fashion that the calculation value of the another maximum linear heat generation rate becomes conservative. Therefore, a smaller value is set to the automatic thermal limit monitor 11 so as o secure a certain margin with respect to the practical thermal limit value. For this reason, the another maximum linear heat generation, rate calculated by the automatic thermal limit monitor 11 is likely to exceed the thermal limit value when the core condition exists in the proximity of the thermal limit value, or when the operation quantity of the fuel rods is great during the calculation by the core monitoring system 12.

When the maximum linear heat generation rate reaches the thermal limit value as indicated by the point A in the drawing, the automatic thermal limit monitor 11 judges that the maximum linear heat generation rate exceeds the thermal limit value and outputs the operation hold instruction to the automatic power regulator system 13 (steps 307 and 308 in FIG. 3). Thereafter, when the calculation result by the core monitoring system 12 does not exceed the thermal limit value as indicated by the point B, the automatic thermal limit monitor 11 outputs the operation hold release instruction to the automatic power regulator system 13 (steps 303, 309 and 310). Incidentally, when the calculation result by the core monitoring system 12 exceeds the thermal limit value, the automatic thermal 1 imit monitor 11 outputs the automatic operation exclusion instruction to the automatic power regulator system 13 (steps 303 and 304).

As described above, the operation hold instruction, the operation hold release instruction and the automatic operation exclusion instruction outputted from the automatic thermal limit monitor 11 are all outputted to the automatic power regulator system 13. Incidentally, a plant activation collective monitoring system 14 instructs at each break point a target electric output and an electric output change ratio to the automatic power regulator system 13 as shown in FIG. 1.

Figure 6:
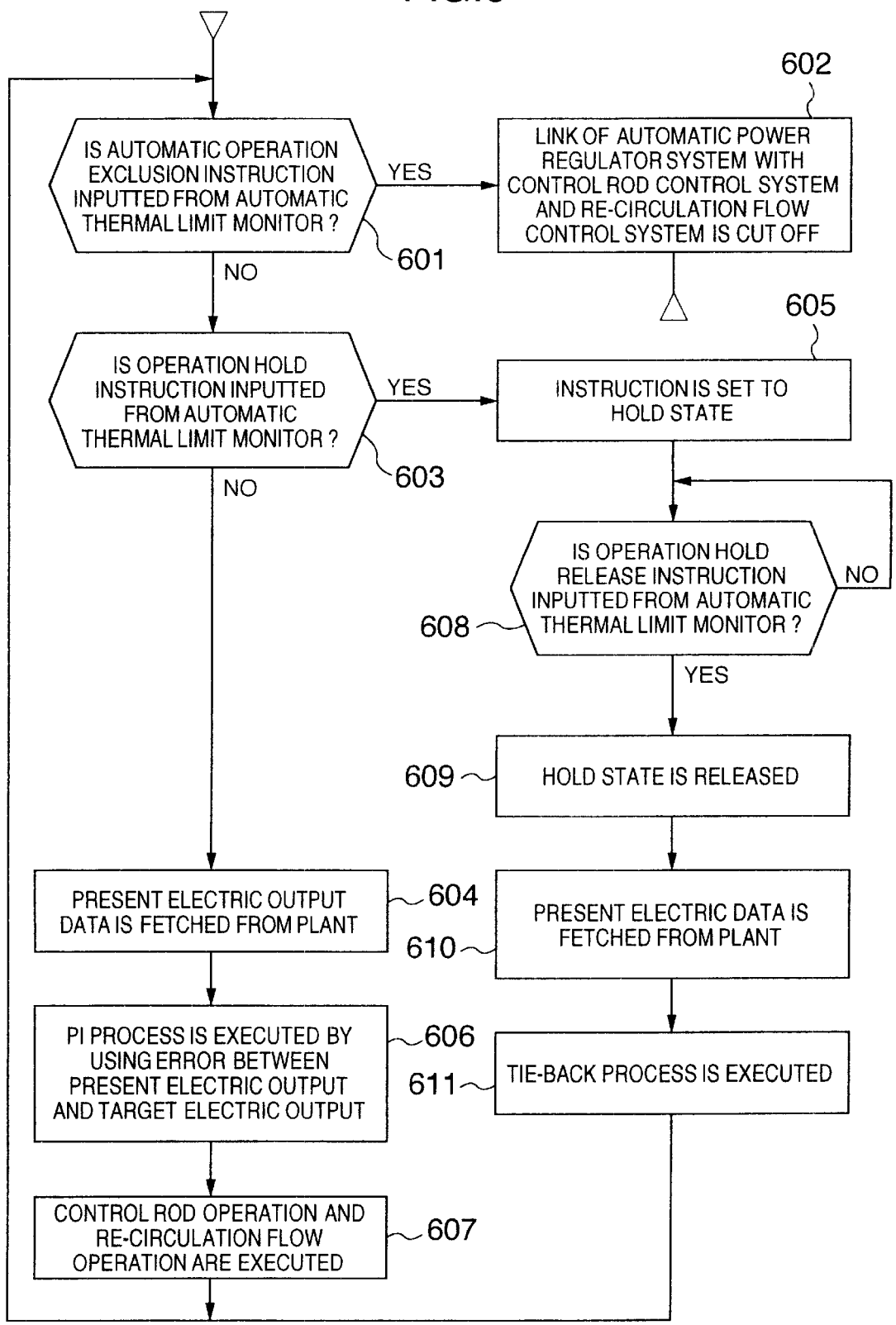
FIG. 6 is a flowchart showing a process in an automatic power regulator system.

FIG. 6 is a flowchart showing the processing content of the automatic power regulator system 13. At the first step 601, whether or not the automatic operation exclusion instruction is inputted from the automatic thermal limit monitor 11 is judged, and the flow proceeds to the step 602 when the automatic operation exclusion instruction is inputted, and to the step 603 when it is not inputted. The link of the automatic power regulator system 13 with the control rod control system 15 and with the re-circulation flow control system 16 is cut off at the step 602. when the link is cut off, the control rod control system 15 and the re-circulation flow control system 16 cannot be controlled any longer from the automatic power regulator system 13. To execute again the automatic power regulation by the automatic power regulator system 13, the link of the automatic power regulator system 13 with the control rod control system 15 and with the re-circulation flow control system 16 must be established once again, and the intervention of the operators becomes necessary.

At the step 603, whether or not the operation hold instruction is inputted from the automatic thermal limit monitor 11 is judged, and the flow proceeds to the step 605 when the operation hold instruction is inputted and to the step 604 when it is not. When the flow proceeds from the step 603 to the step 604, the present electric output data are fetched from the plant. Next, a PI process is executed at the next step 606 by using the error between the present electric output so fetched and the target electric output inputted from the plant activation collective monitor system 14. The control rod operation or the re-circulation flow rate operation is carried out at the next step 607 on the basis of the result of the PI process of the step 606 so that the output can rise from the present electric output to the target electric output at a given electric output change ratio. The control rod operation is carried out by outputting the rod pull-out instruction/rod insertion instruction to the control rod control system 15, while the re-circulation flow rate operation is carried out by outputting a flow rate set value to the re-circulation flow control system 16.

When the flow proceeds from the step 603 to the step 605, the instructions from the automatic power regulator system 13 to the control rod control system 15 and to the re-circulation flow control system 16 are held. In this holding state, the link of the automatic power regulator system 13 with the control rod control system 15 and with the re-circulation flow control system 16 remains established. At the next step 608, whether or not the operation hold release instruction is inputted from the automatic thermal limit monitor 11 is judged. The flow proceeds to the step 609 when the operation hold release instruction is inputted, and the hold state is released at this step 609. When the operation hold release instruction is not judged as being inputted at the step 608, on the other hand, the process of the step 608 is repeated until the operation hold release instruction is inputted.

After the hold state is released at the step 609, the present electric output data is fetched from the plant at the step 610. A tie-back process (initialization process), is executed at the next step 611. Because the process returns to the normal PI control by the tie-back process, the control of the control rod and the recirculation flow rate is started once again.

The control rod control system 15 controls the control rods by controlling the motor drive control circuit 7 in accordance with the rod pull-out instruction/insertion instruction that is inputted, and the re-circulation flow control system 16 controls the motor speed control circuit 10 on the basis of the inputted flow rate set value. The motor drive control circuit 7 and the motor speed control circuit 10 control the control rods 3 and the internal pump 8, respectively.

In the embodiment described above, when at least one of the maximum linear heat generation rate and the minimum critical power ratio determined by the brief calculation exceeds the thermal limit value, the control signal is held while the link of the automatic power regulator system 13 with the control rod control system 15 and the re-circulation flow control system 16 remains established. Therefore, this embodiment can prevent the increase of the reactor output and can smoothly start once again the control of the control rods and the recirculation flow rate without the necessity for reestablishing the link when the calculation result of the maximum linear heat generation rate and the minimum critical power ratio obtained subsequently by the core monitoring system 12 is below the thermal limit values. In other words, this embodiment can easily execute the automatic output regulation by the automatic power regulator system 13 even when the maximum linear heat generation rate and the minimum critical power ratio are determined by the brief calculation in a short cycle. Particularly when the core condition is in the proximity of the limit values, the possibility of the occurrence of the phenomena described above is high, and this embodiment is effective for continuation of the automatic operation.

If the maximum linear heat generation rate and the minimum critical power ratio that are determined accurately by the core monitoring system 12 are below the thermal limit values while the automatic power regulator system 13 is holding the control signal, automatic output regulation can be continued by stopping the holding operation of the control signal by the automatic power regulator system 13 if the actual maximum linear heat generation rate and the actual minimum critical power ratio are below the set values.

Furthermore, if at least one of the maximum linear heat generation rate and the minimum critical power ratio that are accurately determined by the core monitoring system 12 exceeds the thermal limit value while the automatic power regulator system 13 is holding the control signal, automatic output regulation can be stopped by stopping the output of the control signal in the automatic power regulator system 13 when the actual maximum linear heat generation rate and the actual minimum critical power ratio exceed the thermal limit values.

To quickly stop the control of the control rod and the core flow rate when exclusion of the automatic operation is required, the automatic thermal limit monitor 11 may directly output the operation stop signal to the control rod control system 15 and to the re-circulation flow control system 16.

When the LPRM 4 as one of the means for detecting the plant data gets out of order such as short-circuit, the automatic thermal limit monitor 11 cannot calculate the maximum linear heat generation rate and the minimum critical power ratio. Therefore, the operation hold instruction may be given to the automatic power regulator system 13 in this case, too. If the calculation result by the core monitoring system 12 does not exceed the thermal limit value after bypassing the LPRM 4 which is out of order, the operation hold release instruction may be given to the automatic power regulator system 13.

In this embodiment, the calculation of the maximum linear heat generation rate and the minimum critical power ratio in the core monitoring system 12 is made periodically (every 10 minutes). However, it is also possible to output a signal that requests the calculation of the maximum linear heat generation rate and the minimum critical power ratio to the core monitoring system 12 when the automatic thermal limit monitor 11 outputs the operation hold instruction to the automatic power regulator system 13, and to calculate the maximum linear heat generation rate and the minimum critical power ratio by the core monitoring system 12 upon receiving this request signal. Since it becomes possible by so doing to immediately judge whether or not the automatic output regulation is to be continued in the hold state of the automatic power regulator system 13, the automatic output regulation can be executed more smoothly.

What is claimed is:

1. A method of controlling a nuclear power plant comprising the steps of:

determining a first maximum linear heat generation rate and a first minimum critical power ratio in a certain time interval by a first calculation by a core monitoring system;

determining a second maximum linear heat generation rate and a second minimum critical power ratio in a present moment by a second calculation by an automatic thermal limit monitor which corrects the first maximum linear heat generation rate and the first minimum critical power ratio by utilizing values of plant data at a time when the first calculation is made by the core monitoring system and the plant data of the present moment in a time interval which is shorter than the time interval of the first calculation;

comparing the second maximum linear heat generation rate and the second minimum critical power ratio with predetermined thermal limit values, respectively; and holding a control signal outputted from an automatic power regulator system to a re-circulation flow rate control system and to a control rod positioning control system when at least one of the second maximum linear heat generation rate and the second minimum critical power ratio exceeds the predetermined thermal limit values.

2. A method of controlling a nuclear power plant according to claim 1, further comprising the steps of:

determining the first maximum linear heat generation rate and the first minimum critical power ratio by the first calculation by the core monitoring system under the state where the control signal outputted from the automatic power regulator system is held;

comparing the first maximum linear heat generation rate and the first minimum critical power ratio so determined with the predetermined thermal limit values; and stopping the holding of the control signal in the automatic power regulator system when the first maximum linear heat generation rate and the first minimum critical power ratio are below the predetermined thermal limit values.

3. A method of controlling a nuclear power plant according to claim 1, further comprising the steps of:

determining the first maximum linear heat generation rate and the first minimum critical power ratio by the first calculation by the core monitoring system under the state where the control signal outputted from the automatic power regulator system is held;

comparing the first maximum linear heat generation rate and the first minimum critical power ratio so determined with the predetermined thermal limit values; and stopping the output of the control signal in the automatic output regulator system when at least one of the first maximum linear heat generation rate and the first minimum critical power ratio exceeds the predetermined thermal limit values.

* * * * *